T. P. WALSH.
LOOM FOR TYING ORIENTAL KNOTS.
APPLICATION FILED FEB. 13, 1908.
1,064,405.
Patented June 10, 1913.
8 SHEETS—SHEET 7.
Fig. 15.
Fig. 16.
Fig. 17.
Fig. 18.
Fig. 19.  Fig. 20.
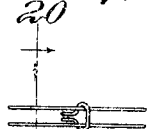 
Fig. 21.  Fig. 22.
 
Fig. 23.  Fig. 24.
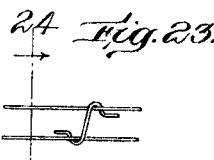 
Fig. 25.  Fig. 26.
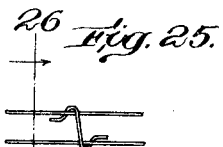 
Witnesses:
H. C. Bowser.
Edward Maxwell
Inventor:
Thomas P. Walsh,
by Geo. H. Maxwell
Atty.

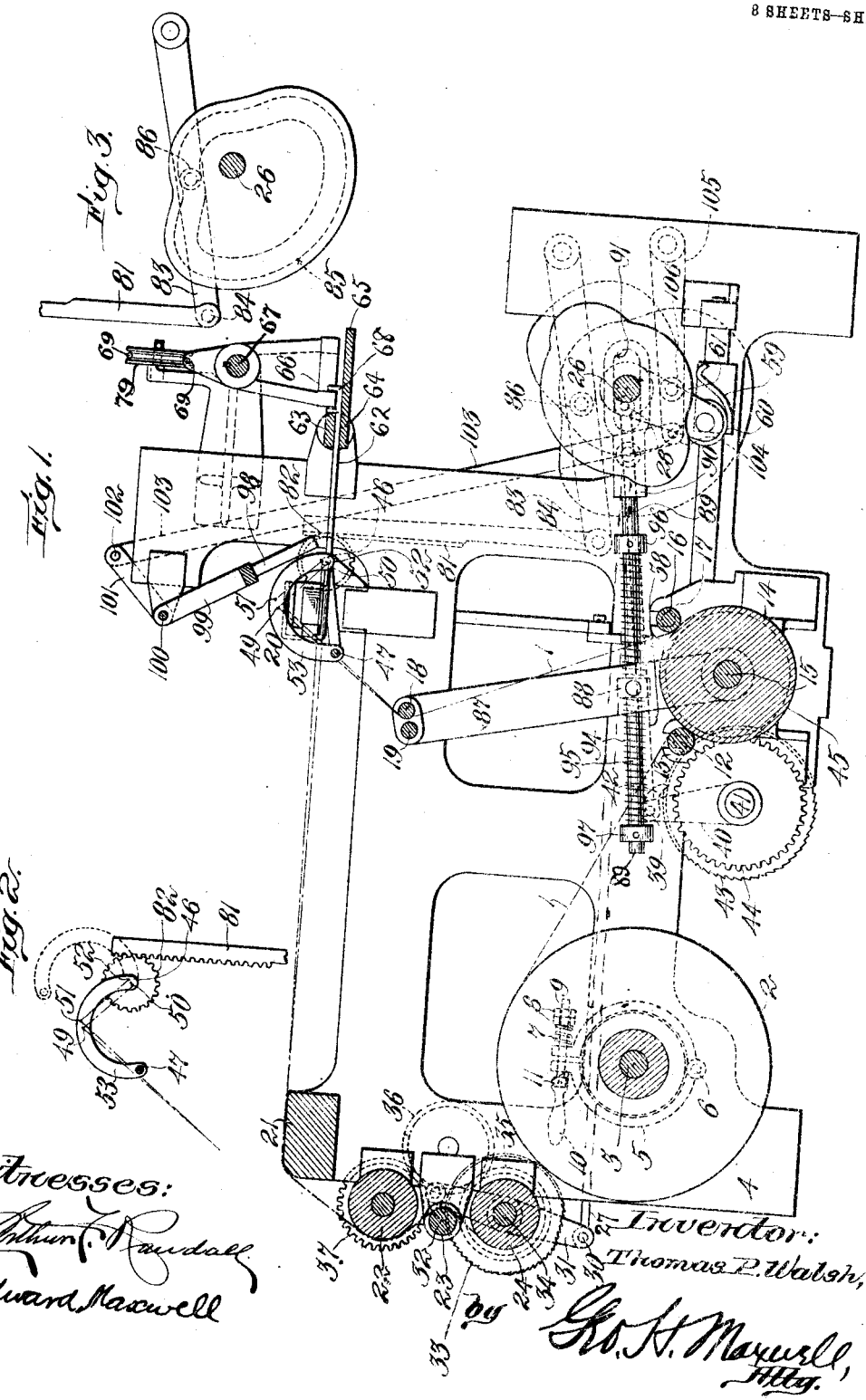
T. P. WALSH.
LOOM FOR TYING ORIENTAL KNOTS.
APPLICATION FILED FEB. 13, 1908.
1,064,405.
Patented June 10, 1913.
8 SHEETS—SHEET 1.

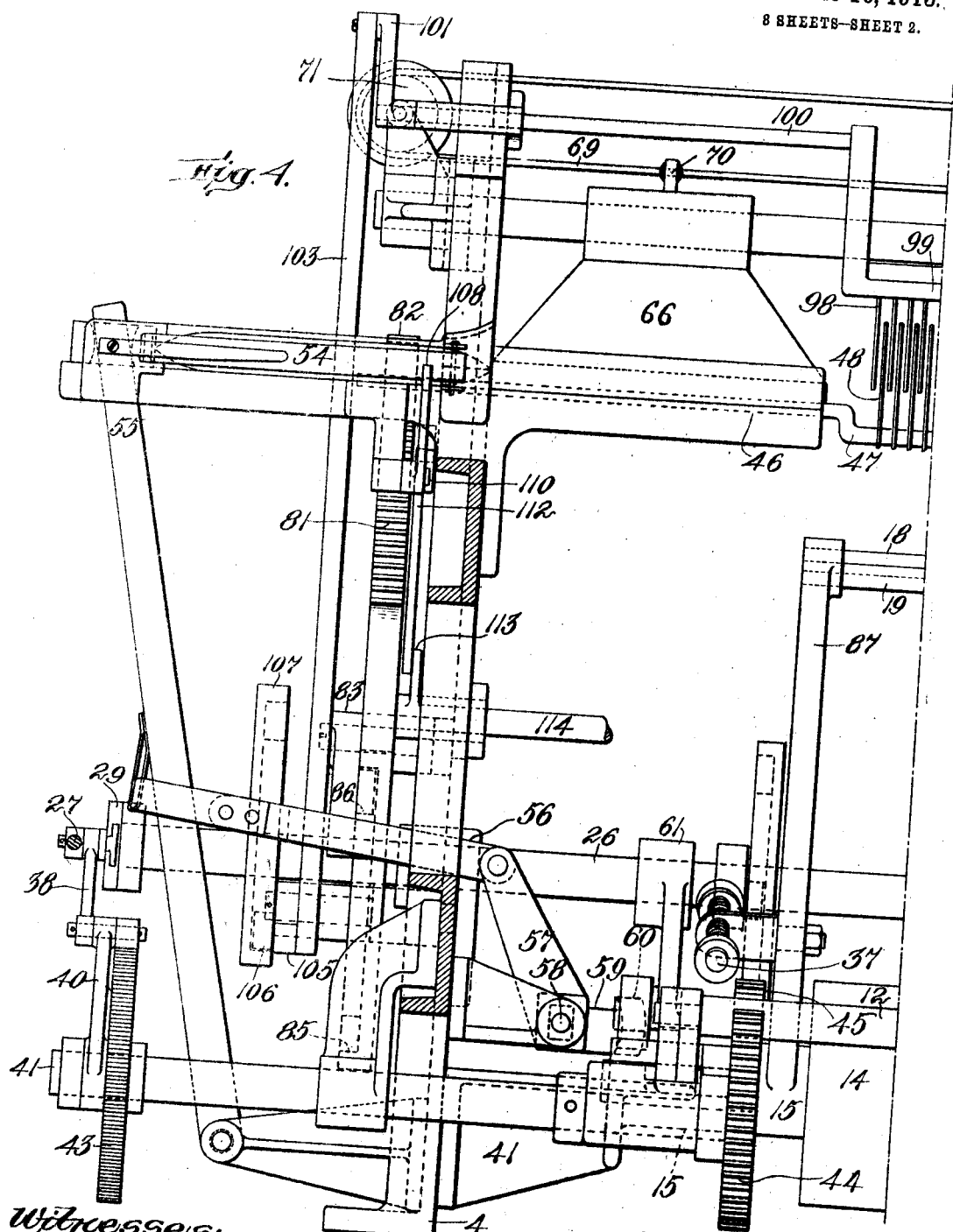

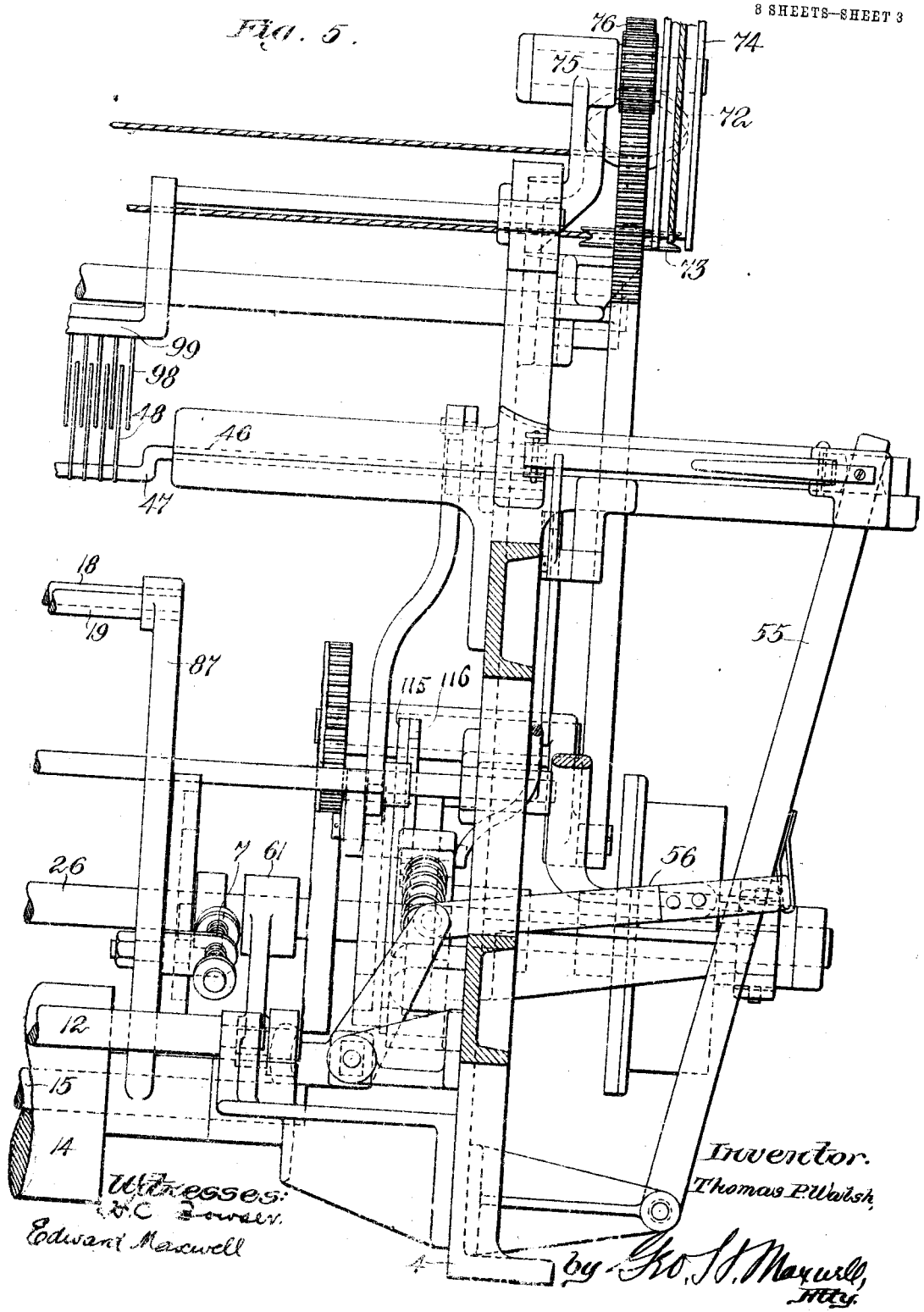

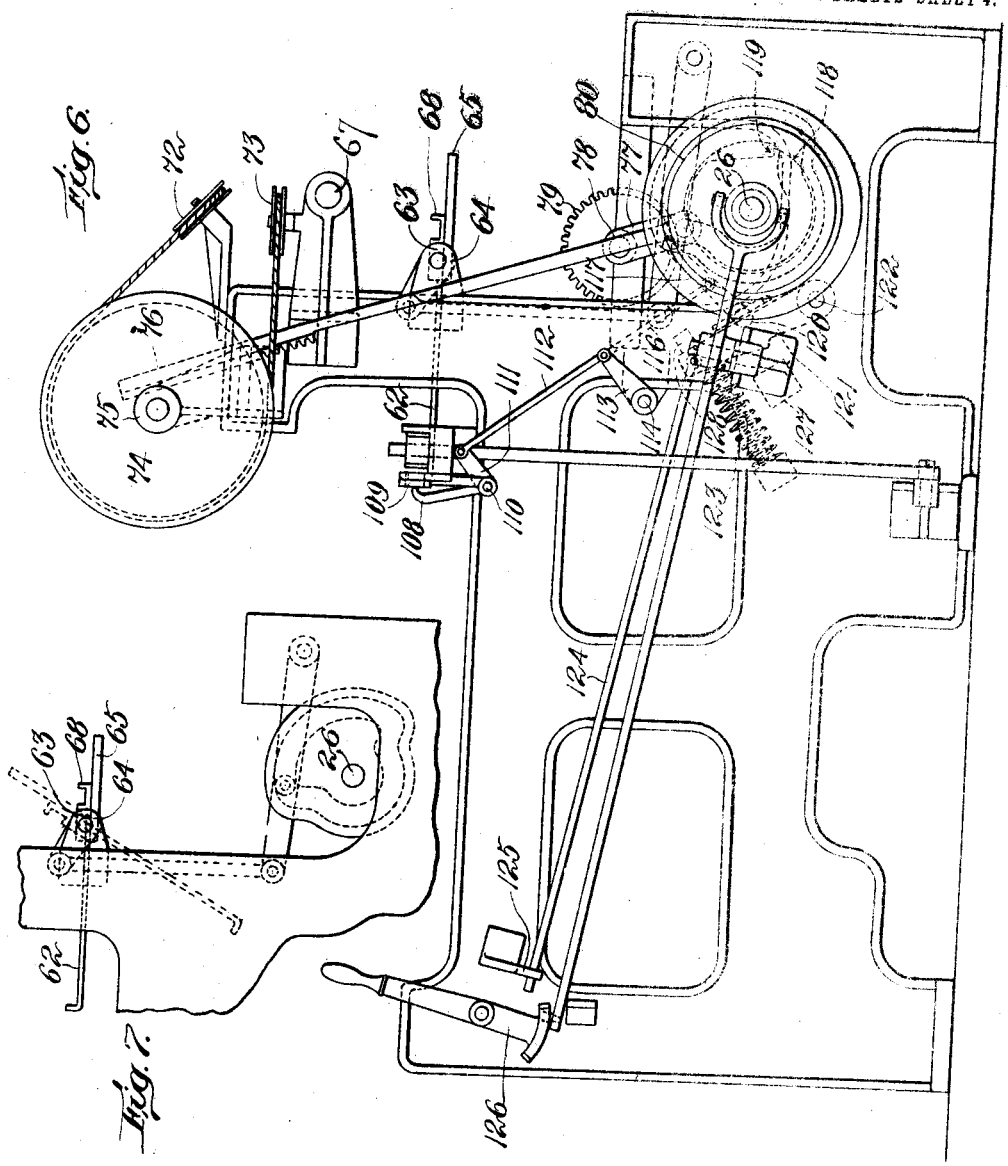

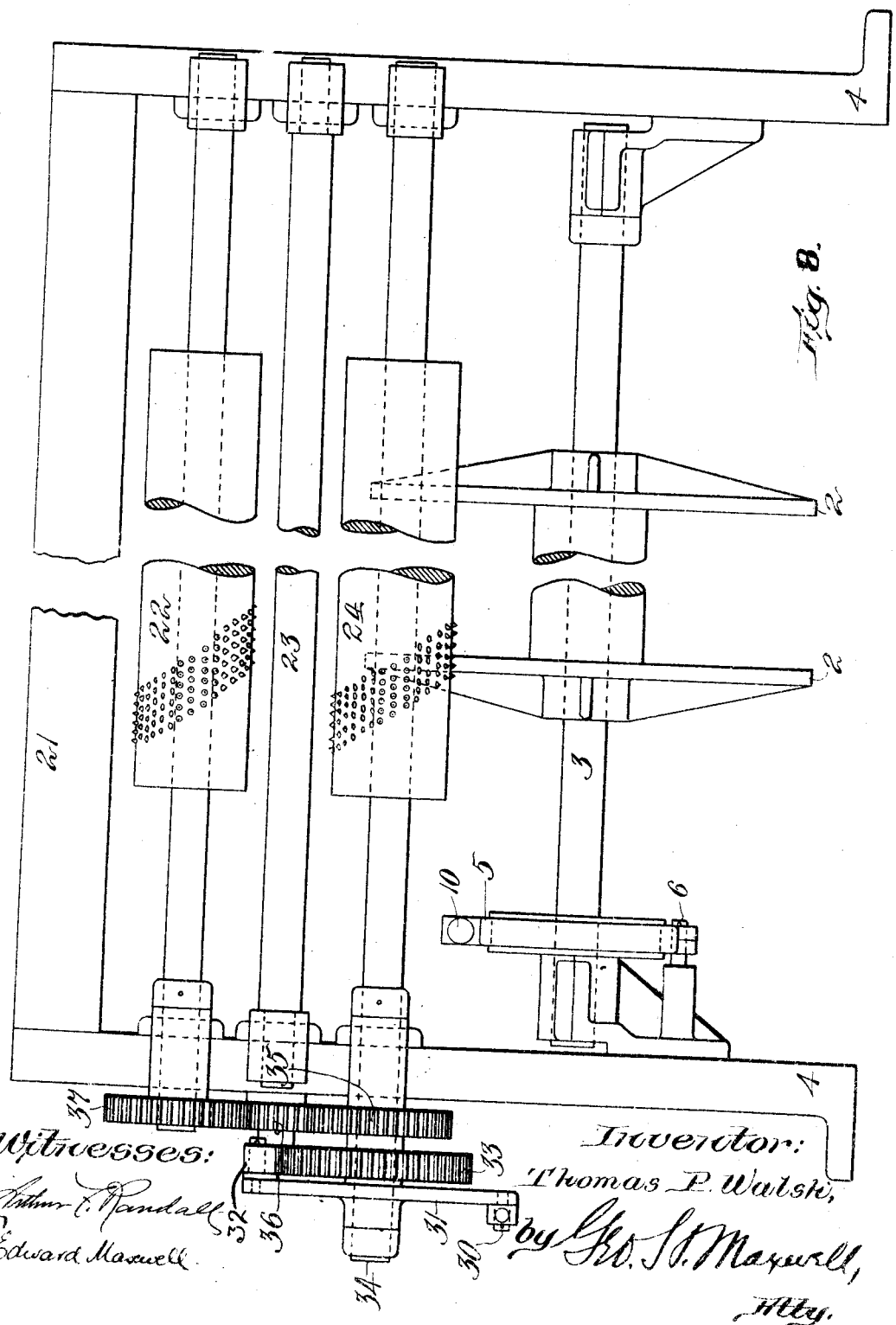

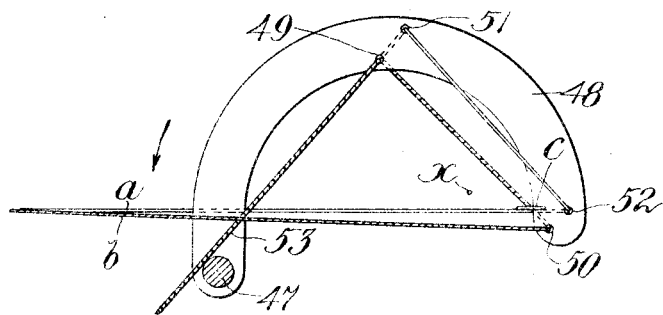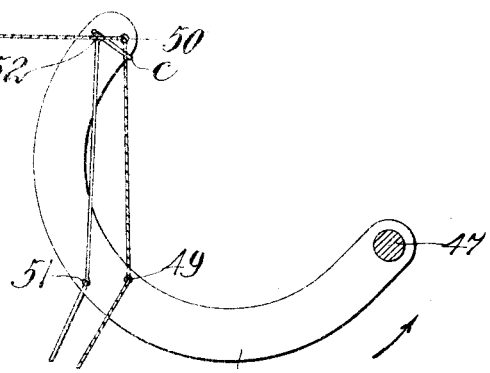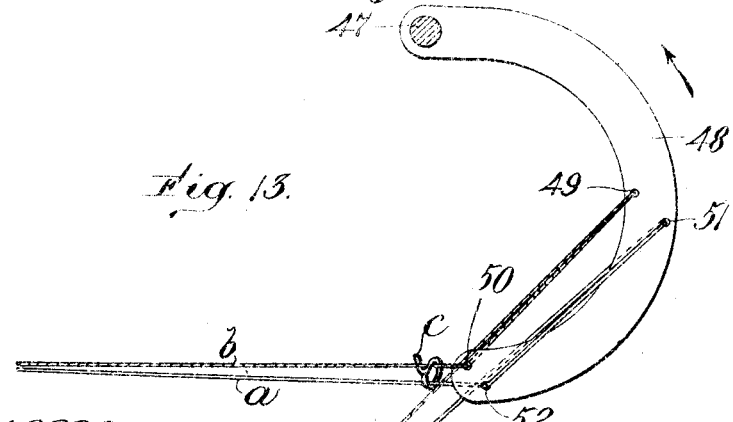

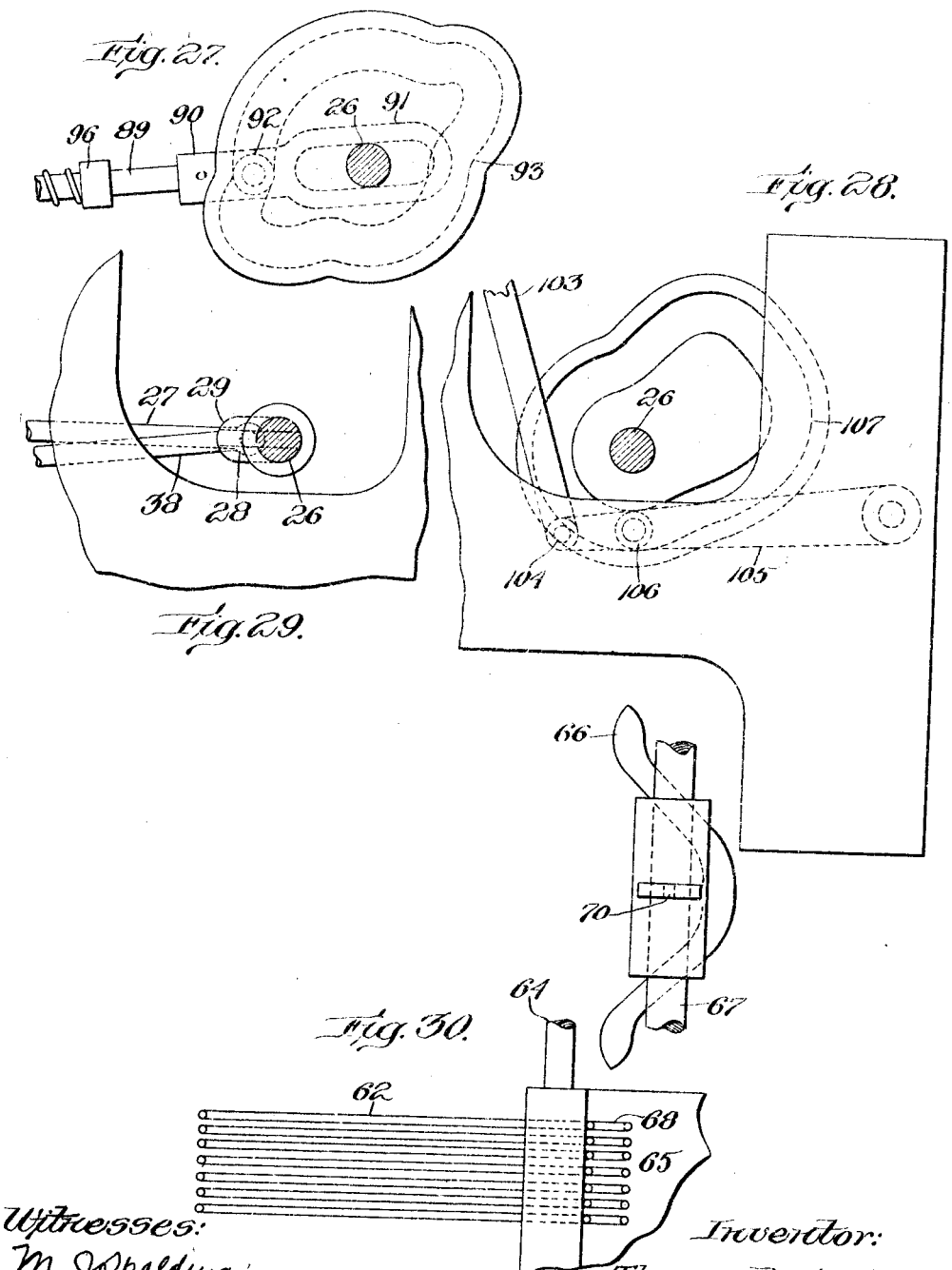

UNITED STATES PATENT OFFICE.

THOMAS P. WALSH, OF WORCESTER, MASSACHUSETTS, ASSIGNOR TO WALSH-BAKER CORPORATION, OF PORTLAND, MAINE.

LOOM FOR TYING ORIENTAL KNOTS.

1,064,405.  Specification of Letters Patent.  Patented June 10, 1913.

Application filed February 13, 1908. Serial No. 415,780.

*To all whom it may concern:*

Be it known that I, THOMAS P. WALSH, a citizen of the United States, residing at Worcester, in the county of Worcester and State of Massachusetts, have invented an Improvement in Looms for Tying Oriental Knots, of which the following description, in connection with the accompanying drawings, is a specification, like letters on the drawings representing like parts.

My invention is a knot-tying mechanism and related parts adapted for use in a loom for accomplishing mechanically what has been accomplished before by hand in the weaving of Oriental rugs, i. e., rugs, carpets, and woven products in which the filling, pile or other weft-like portions are tied, looped or knotted immovably to the warps in the course of the continuous weaving of the fabric, the complete loom being shown and claimed in my copending application, Ser. No. 429,297, and the present case covering the coiling, knotting and looping mechanism broadly without reference to a compact, woven (properly so-called) fabric.

I do not intend to restrict my invention to the formation of the particular kinds of knots commonly found in Oriental rugs, as my invention is applicable to a much wider range of products, being in fact readily adaptable to all varieties of fabrics containing warp and weft and in which it is desirable that the two shall be immovably connected at various intersecting portions throughout the fabric.

My invention will be more clearly and fully understood from the following detailed description of several illustrative embodiments of the invention which I have devised as preferred forms of mechanism for weaving slightly different varieties of products.

In the drawings, Figure 1 is a central vertical sectional view of the particular embodiment of my invention herein shown for purposes of illustration; Fig. 2 is a fragmentary sectional view showing the knotter and its path of movement; Fig. 3 shows in side elevation the cam which actuates the knotter; Figs. 4 and 5 are transverse vertical sectional views showing certain portions of the loom mechanism at the left hand side of the machine and at the right hand side of the machine respectively; Fig. 6 is a view of the loom in side elevation; Fig. 7 is a fragmentary side elevation of the mechanism which operates the pile loop-drawing needles or fingers; Fig. 8 shows part of the front end of the loom; Figs. 9, 11, and 13 show in side elevation the knotter in successive positions, two warp threads being shown threaded in a single knotter for accomplishing the knotting movements of the loom; Figs. 10, 12, and 14 are plan views of the same parts in corresponding positions to Figs. 9, 11, and 13; Figs. 15–18 show in plan view different ways of threading the knotters when a pair thereof are used instead of one as in the preceding figures; Fig. 19 shows diagrammatically the way the knot is tied when the knotters are threaded as shown in Figs. 9–15. Fig. 20 shows the same viewed on the line 20, Fig. 19; Figs. 21 and 22 are similar views with reference to Fig. 16; Figs. 23 and 24 as to Fig. 17; Figs. 25 and 26 as to Fig. 18; Figs. 27–29 are fragmentary sections showing respectively in elevation the cam and path 93 in which the roll 92 travels, the cam and its path 107 in which the roll 106 travels, and the crank 29 of the shaft 26 to which the rods or links 27 and 38 are connected; and Fig. 30 shows in plan the reciprocating cam 66 for drawing back the needles.

Before entering upon the detailed description, it may be well to point out that my invention is broadly distinguished from previous attempts to weave a knotted pile fabric, in that it knots a weft on a warp, as distinguished from knotting a warp on a weft. As a result, I am enabled to use one and the same thread, thrown from a shuttle or any other means, to form simultaneously all the piles entirely across the fabric. I do not intend to limit myself in any way to the means of putting the shot or pick of weft (by which term I mean to include any and all transverse pile threads) across the loom, as it may be by a shuttle, eye needle, nipper needle, or what not. For clearness of presentation of my invention, in its broader aspects, I have shown the simplest kind of embodiment, viz. a loom making fabric for chenille, fringes, and the like, in which the weft is formed around all the contiguous warp threads, but I wish it understood that my invention, as hereinafter broadly claimed, is not limited in the latter respect.

In the present construction the warp threads 1 may be considered to all intents and purposes as endless, i. e., they have no definite beginning or end, but the fabric as it is woven is rolled or gathered forward continuously, so that the loom is capable of weaving a product of indeterminate length. A usual warp beam 2 is loosely journaled at 3 in the loom sides 4, having preferably its tension delicately adjusted in usual manner by a friction strap 5 fast at 6 to the journal box at one side of the loom, the ends of said strap 5 being yieldingly adjustable by a spring 7 and nut 8 on a threaded bolt 9 provided at its opposite end with a handle 10 having a releasing cam 11 normally in clamping position, as shown in Fig. 1. From this warp beam 2 the warps 1 are led over a guide roll 12 which is loosely journaled or held in forks 13, and thence about a let-off drum 14 journaled at 15 in the loom sides, preferably positively actuated by let-off mechanism to be described, a guide roll 16 similar to the guide roll 12 being mounted in similar forks 17 and preferably arranged on the outgoing side of the let-off drum in about the same position that the roll 12 occupies at the ingoing side, whereby the warps are held in proper frictional engagement with the let-off drum and directed between transverse rods 18, 19, for easing the warps periodically to permit the knotter 20 to perform its operations to the best advantage. From the roll or easing device 18, 19, the warps pass to the knotter 20 at the rear of the loom, and from the knotter pass forward preferably horizontally over the breast beam 21 to a usual geared take-up roll 22, guide roll or pressure roll 23, to a final take-up roll 24, and thence the finished product may be delivered to the floor or a winding machine or any other place or mechanism desired, said take-up mechanism being preferably operated from the same main driving shaft 26 which operates all the cam mechanism or other moving means provided for actuating the loom, said take-up mechanism being herein shown as actuated by a link or rod 27 adjustably secured at 28 to a crank 29 fast on the shaft 26 at the rear end of the machine and pivoted at 30 to a pawl arm 31 at the forward end of the machine, said arm carrying a pawl 32 engaging a ratchet 33 fast on the end of a shaft 34 to which the lower take-up roll 24 is secured, said shaft also carrying a gear 35 meshing with an idler 36 in driving engagement with a gear 37 which drives the upper take-up roll 22. The let-off, as already stated, is positively operated the same as the take-up just described. Connected to the same crank 29 already mentioned is a link or rod 38 pivoted at 39 to a pawl arm 40 loose on a shaft 41, whose pawl 42 engages a ratchet wheel 43 fast on the outer end of said shaft 41, which drives a gear 44 at the opposite end of said shaft 41, said gear 44 being in mesh with a pinion 45 fast on the shaft 15 to which the let-off roll 14 is secured.

The knotter 20 comprises, in the device of the drawings, a shaft having axially rotary ends 46 and an offset portion 47 and provided with a series of warp carriers 48 each arch shaped in form, as best shown in Figs. 1, 2, 9, 11, and 13. Each warp carrier may manipulate two warp threads, as shown in Figs. 9–14, and for this purpose is provided with holes or thread eyes 49, 50, for one warp, and 51, 52, for the other warp, the respective warps being threaded through said eyes as shown in Figs. 9–18, as, for instance, one warp thread is threaded through the eye 49 from the near side, Figs. 1, 9–14, and thence is led down the farther side of the warp carrier to the eye 50, through which it is passed back again and thence is led along over itself at 53, over the breast beam 21 to the take-up roll, and its companion warp is led upwardly along the rear side of the same warp carrier and threaded through the eye 51 to the near side of said warp carrier, Fig. 9, and thence down and through the eye 52 to the rear side again of said warp carrier and across itself to the breast beam 21 and take-up roll, so that the diagonally upwardly extending strands of the two warps from the easing rods 18, 19 pass between the horizontal strands or portions of said warp threads as the latter are carried forward to the breast beam. I prefer to pass the two horizontal portions of the two warps outside of the upwardly extending portions rather than a reverse arrangement, although I wish it understood that I do not restrict myself to this preferred arrangement. Having threaded all the warp carriers 48 in the manner just described, the shaft 46 is given an approximately three-quarters turn or rock from the position shown in Figs. 1, 2, and 9 to the position shown in Fig. 13. When the parts are in the position shown in Fig. 9 a sufficient dwell is given for the passage of the weft or filling thread, which may be accomplished by any usual or preferred mechanism, and accordingly I have herein simply indicated a usual shuttle 54 driven by a picker stick 55 connected by a usual picker stick connector 56 to an arm 57 actuated by a shaft 58 and picking shoe 59 and picking ball 60 on an arm 61 fast on the main driving shaft 26, all in usual manner.

In connection with the passage of the shuttle or rather the proper placing of the weft thread, by whatever mechanism it may be placed, whether shuttle or not, it is necessary to provide some means for preventing the weft thread from remaining taut, and accordingly as a convenient means of accomplishing this object, I provide a series of needle-like devices for engaging the weft thread at a plurality of places throughout its length across the loom and pulling it transversely so as to provide said necessary slack. To this end, just before the shuttle accomplishes its transverse movement above described, I raise a series of needles 62 from the dotted position shown in Fig. 7 to the full line position shown in Figs. 1 and 7. Said needles are slidingly mounted at 63 in the pivoted hub end 64 of a plate 65, which serves not only to swing the needles as described, but, because of its plate shape, to direct the needles in their subsequent backward movement. This movement is accomplished by a cam 66 arranged to reciprocate transversely of the loom on a shaft 67, said cam being shown best in Figs. 1, 4 and 30, and arranged to engage the forks 68 provided at the rear ends of the respective needles. By this means the needles are drawn rearwardly successively and serve to pull the weft thread transversely across the warp carriers so as to introduce the requisite amount of slack into the thread. The reciprocating movement of the cam 66 is given by a cord or band 69 to which the cam 66 is fastened at 70, said cord being guided by guide wheels 71, 72, 73, and driven by a drum 74 provided with a pinion 75 operated by a rack 76 actuated by a crank arm 77 extending from a shaft 78 driven by a pinion 79 in mesh with a mutilated gear 80 fast on the main driving shaft, said mutilated gear and its pinion being so proportioned and constructed as to give the requisite dwell at the end of the slack producing motion to permit the knotting movements to take place before the return movement of the slack producing cam. The needles when in their initial horizontal position also constitute a convenient supporting track or raceway for the passage of the shuttle. This is not essential but, in view of the fact that the warps are led around in a loop, or in other words each warp is looped over and held open while the weft is passed through it, it is desirable that the shuttle should have a stronger support than merely that of the warps. As soon as the shuttle 54 has shot under the arch of the warp carriers, and hence through the warp loops just mentioned, formed in the body of the warps by the position of the warp carriers at the moment, said warp carriers are reversed in position by the rocking of the shaft 46 over to the left, see dotted lines Fig. 2. As the shuttle thread has been deposited within the two warp loops provided by each warp carrier 20, the result is that when the latter carries one terminal of each warp loop around under said shuttle thread or filling it forms a coil in each warp about the filling thread, but as the warps are comparatively taut and the filler is slack, the warp immediately straightens out, thereby compelling the filler to assume the coiled shape and virtually transferring the coil or loop of each warp thread to the adjacent portion of the filling, with the result that the latter is thereby coiled around the two warps by two coils, the filling projecting upwardly from between said warps. This double coiling constitutes the knotting referred to, and is exactly the same kind of a knot that is tied by hand in the Turkish or Oriental rug. The operation will be better understood viewing Figs. 9–14, where it is shown in detail. I have designated the two warps as $a$, $b$, and the weft as $c$. In the position Figs. 9 and 10 the weft is shot through the arch of the knotter 20, leaving the weft in the position $x$, whereupon the needles 62 pull the weft back tight into the corner as far as it can go toward the right, Fig. 9 as shown at $c$, Figs. 9 and 10, and thereupon the shaft 47 rocks, swinging its offset portion so as to move the carriers about their free ends as a center, the first portion of said swinging movement placing the parts as shown in Figs. 11 and 12, at which time the needles 62 have released the drawn back weft, which is then held as shown in Fig. 11 by the forwardly extending strands from the eyes 50, 52 with the loop over the edge of the carrier. At this moment the reed or comb (presently described) is just getting ready to operate, and as the knotter continues its movement to the position Fig. 13 the reed engages the weft and shoves it from the carrier 48 forward along the two warps on which it is now knotted as shown in Figs. 19 and 20. A special reed now beats up in usual manner, and the warp carriers 48 are returned to their original position by the reverse rocking of the shaft 46.

The rocking movement of the shaft 46 and the swinging action of the carrier or knotter 48 may be accomplished by a wide variety of mechanisms, that herein shown consisting of a rack 81 meshing with a pinion 82 fast on the shaft 46, said rack being pivoted to a swinging arm 83 at 84, operated by a path cam 85 in which a roll 86 of said arm travels. To permit the requisite loop-making and swinging movement of the knotter, and yet maintain taut the horizontal extent of warps 1, I provide the easing mechanism with movements timed in such a manner that as the warp carriers 48 start to swing downwardly from the position Figs. 1 and 9, the easing rods 18, 19 swing back to the left just sufficiently to prevent any slack occurring in the warps, and as the warp carriers 48 move farther around in their swinging movement, the easing bars move back to the right until they assume an approximately vertical position, at which time the warp carriers 48 have completed their swinging movement around under to the right and are ready to return, whereupon as they return the easing bars swing again to the left until the carriers 48 have nearly reached their original position, and as they move up finally into their original position the easing bars swing back to the position shown in Fig. 1. In other words, the timing of the movements is such that the easing bars simply maintain the same tension at all times on the warps. To effect this movement of the easing bars, I have mounted them on arms 87 pivoted loosely on the shaft 15, and connected by a swiveled block 88 to a rod 89 pinned to a member 90 slotted at 91 to straddle the shaft 26, and provided with a cam roll 92 traveling in a path cam 93 on the shaft 26, and in order that the easing bars may be capable of giving away or yielding whenever necessary, I have connected the block 88 to the rod 89 yieldingly by passing said rod loosely through the swivel block and providing opposite springs 94, 95 on said rod, bearing at their adjacent ends on the swivel block 88 and at their opposite ends respectively on adjustable collars 96, 97. For instance, the easing bars must yield in case the take-up takes up faster than the let-off roll lets off the warp, or in case the shuttle should lodge in the knotter. As herein shown, the beating-up reed consists of a usual reed or comb 98 whose frame 99 is pivoted at 100 to the loom frame, and operated by an arm 101 to which is pivoted at 102 a link 103 pivotally connected at 104 to a swinging arm 105 actuated by a cam roll 106 traveling in a cam path 107 whose cam is fast on the main shaft 26. The shape of the warp carriers, etc. is such that when said warp carriers are swung around under to the right and upward into their extreme position, as shown in Fig. 13, the reed mechanism may perform its beating-up operation, the cams being so timed that at this moment the reed 98 swings forward to the requisite extent to accomplish the required beating-up. This form of loom is well adapted to chenille work, making fringe, and any kind of a pile fabric, whether the piles are solid or intermittent. By maintaining the shuttle thread or pile thread intact while the weaving and knot-tying progress, it becomes possible and practicable to operate the loom continuously, and to beat up and maintain the knots properly tied when once tied.

My invention makes it practicable to tie knots continuously, if desired, in this shuttle thread, as it is moved back and forth on successive picks, and to maintain the weaving properly certain at all times. I wish especially to emphasize a further important advantage and novelty resulting from this form of mechanism, namely, that by its aid the pile is formed of filling or weft threads, and the entire row of piles or pile loops throughout the entire width of the fabric being woven is made from a single filling or weft thread. This is especially serviceable, as already intimated, in accomplishing a wide variety of weaving effects which have either been heretofore exceedingly expensive or been considered impossible, as, for instance, by introducing a shedding motion and another picking motion in order to introduce the requisite body or ground filling, this loom will weave superior corduroy or pile fabric in which every pick of loops is cut, and in which each pile is bound or knotted, as distinguished from the present corduroy or pile fabric, in which a plurality of picks must be left without being cut, in order to bind or hold secure the other picks which are cut to form the pile fabric. In other words, my present mechanism is useful in connection with the manufacture of any and all kinds of pile fabrics so that each pile will be knotted in place.

By the application of a usual box motion and pattern controller, the loom may be run with a series of shuttles, thereby getting all the different effects of pattern, yarn, color, etc. obtained by the use of a box motion, and yet each pile will be knotted immovably in place.

As it is my desire to obtain in the present case my broad claims for the weaving of a weft knotted with Oriental knots, I have not shown these various more complicated structures, but have reserved them in connection with other pending applications (Ser. No. 425,918 and Ser. No. 429,297) in which they are set forth and claimed.

Any suitable protection mechanism may be employed in connection with my loom to prevent a shuttle-smash, and for this purpose I have shown as one convenient means of accomplishing this purpose a protecting finger 108 adapted to engage at its free end against the box binder 109 being pivoted at its opposite end at 110 on the shuttle box and operated by an arm 111 connected by a link 112 to a crank 113 on a transverse shaft 114 provided with another arm 115 similar to the arm 113 connected by a link 116 to a dagger 117 whose free end is in the path of a disk 118 notched at 119 to receive said dagger, whose opposite end is pivoted at 120 to an arm 121 pivoted at 122 on the frame of the loom, and at its opposite end held yieldingly forward by a spring 123, so that when the shuttle is in the box the parts remain as shown in Figs. 4 and 6, but when the shuttle fails to enter the box the protector finger 108 moves forwardly to the right, thereby permitting the dagger 117 to swing downwardly into the path of the notch 119, which thereupon strikes said dagger and instantly forces the dagger 117 and its arm 121 back to the left, Fig. 6, and shoves a slide rod 124 through a guide 125 against the shipper handle 126 to throw off the driving belt of the loom, and in case the loom does not instantly stop, I provide a rigid block 127 against which the arm 121 may strike and thereby compel the driving shaft to stop instantly, an opposite rigid block 128 being preferably provided to prevent an undue rebound on account of the spring 123. No claim is made to the protection mechanism, as such mechanism is common in looms.

The operation of the loom has already been described in connection with the mechanism. Stated in general, it consists in forming a loop in each warp thread, or in those warp threads on which the weft is to be secured, then passing the weft thread through said loops, and at the same time providing the desired amount of slack in said weft thread required, then straightening out the warp threads, causing the knotting coils to form in the weft about said warp threads, and finally beating up the knotted loops. The slack-producing mechanism is preferably so constructed that the needles begin to draw in the slack as soon as the shuttle has passed the first needle, so that when the shuttle has reached the end of its pick the slack has already begun to be provided. When the shuttle goes back in the opposite direction, the needles operate in a reverse order, thereby greatly facilitating the speed of the slack-producing operation. I wish it understood, however, that I am not limited to any particular means of producing this slack, nor in fact to producing it independently of the shuttle, as any means which results in causing the shuttle to throw out or give up more thread or yarn than it would naturally give up comes within the spirit and scope of this part of my invention.

As already stated, the fabric when cut produces a valuable product for fringes and ornamentation of other fabrics, and as the importance of this feature of my invention (aside from its use in connection with rug weaving) renders it of much value, I wish it understood that the use of said product is varied and extensive, including such ornamental work as portières, piano-covers, quilts, dresses, table-cloths, rugs, tidies, chair-covers, etc. where chenille or fringe work is required. For instance, it is useful when used for delicate silk or cotton or worsted fringes, or in fact with even the coarsest of hemp or jute yarns, especially in color combinations and intricate pattern work, which is rendered extremely practicable by this machine.

Having described my invention, what I claim as new, and desire to secure by Letters Patent, is:

1. In a loom, warp-supporting means, combined with mechanism for knotting an intact weft thread onto the warp threads, including mechanism for coiling said intact weft thread about the warp threads with one coil only for any given warp thread in a series of circular, substantially parallel weft-thread coils lying in edge-to-edge alinement in a plane perpendicular to the general longitudinal direction of the warp threads.

2. In a loom, means to support warp threads in pairs, means for delivering a weft thread transversely thereof, coöperating means to tie said weft thread, while intact, on each of said pairs of warp threads, with a tie comprising a transverse portion embracing both warp threads of the pair and thence from the opposite ends of said transverse portion extending in a single coil around the individual warp threads and out between them at a point adjacent the middle of said portion, with the weft thread thence extending in one direction to the same point in a tie of an adjacent pair and in the other direction to the same point in a tie of a pair in said other direction.

3. In a loom, means to support warp threads in pairs, means for delivering a weft thread transversely thereof, coöperating means to tie said weft thread, while intact, on each of said pairs of warp threads, with a tie comprising a transverse portion embracing both warp threads of the pair and thence from the opposite ends of said transverse portion extending in a single coil around the individual warp threads and out between them at a point adjacent the middle of said portion, with the weft thread thence extending in one direction to the same point in a tie of an adjacent pair and in the other direction to the same point in a tie of a pair in said other direction, and means for beating up the tied weft thread all across the loom with a movement lengthwise of the warp threads.

4. In a loom, warp-supporting means, combined with mechanism for knotting an intact weft thread onto the warp threads, including mechanism for coiling said intact weft threads in a series of circular, weft-thread coils lying in substantially edge-to edge alinement across the loom in a plane perpendicular to the general longitudinal direction of the warp threads, and means for beating up all of the weft threads along the warp threads into continuous contact with each other with their said circular coils parallel to each other and flat against each other along said warp threads.

5. In a loom, warp-supporting means, weft mechanism for forming weft loops in an intact weft thread, and mechanism for coiling said intact looped weft thread about the warp threads in a series of substantially parallel and lengthwise, edge-to-edge alined weft-thread coils lying in a plane transverse to the longitudinal direction of the warp threads.

6. In a loom, means for supporting a series of warp threads, mechanism for forming a series of weft loops in a single intact weft thread, mechanism for coiling together successively a plurality of intact looped weft threads and said warp threads, and means for beating up the coiled intact weft threads.

7. In a loom, supporting mechanism for supporting ground warp threads in weaving position, and means for coiling individual ground warp threads around a weft thread in the process of coiling the weft thread around the warp threads, including means for ultimately so coiling said weft thread in coils around the warp threads.

8. In a loom, means for supporting warp threads in weaving position, means for delivering a weft thread transversely of said warp threads, and means for tying said weft thread while intact in a series of oriental coils around said warp threads at a plurality of places throughout the length of said as yet uncut weft thread.

9. In a loom, means for supporting warp threads in weaving position, means for delivering a weft thread transversely of said warp threads, means for forming a series of loops in said single weft thread, and coöperating means for tying said loops while the weft thread is intact in circular coils of weft thread about the straight warp threads, and beating-up means for sliding the weft-thread coils together along the warp threads lengthwise of the latter.

10. In a loom, means for supporting a series of warp threads in pairs in weaving position, and means for securing an intact weft thread to the successive warp threads by coiling the intact weft thread around individual warp threads by a succession of coils, some at least of which pass entirely around in a complete circle and some embrace the two threads of a pair with the coil ends both extending in the same direction through between the pair thus embraced, throughout the length of the weft thread, said means including mechanism for simultaneously forming said coils.

11. In a loom, means for supporting a series of warp threads in weaving position, and mechanism for securing a weft thread around individual warp threads simultaneously at three or more separated places throughout the length of the weft thread while the latter is intact, and means for beating up the weft threads lengthwise of and along the warp threads.

12. In a loom, means for supporting a series of warp threads in weaving position, mechanism for securing a weft thread to individual warp threads at a plurality of separated places throughout the length of the weft thread, said mechanism including means for forming a loop longitudinally of the warp threads in each of the last mentioned individual warp threads, means for introducing through said loops said weft thread, and coöperating means for transferring the longitudinal warp-loop formation into transverse weft loops or coils about the warp threads.

13. In a loom, means for supporting a series of warp threads in weaving position, mechanism for knotting a weft thread to warp threads at a plurality of separated places throughout the length of the weft thread, said mechanism including means for forming a loop longitudinally of the warp threads in each of the last mentioned individual warp threads, means for introducing through said loops said weft thread, coöperating means for transferring the longitudinal warp-loop formation into transverse weft loops or coils about the warp threads, and means for beating up the knotted weft.

14. In a loom, means for supporting a series of warp threads in weaving position, mechanism for securing a weft thread to individual warp threads at a plurality of separated places throughout the length of the weft thread, said mechanism including means for forming in the last mentioned individual warp threads a series of loops in alinement with each other forming an arch extending transversely of the series of warp threads, means for delivering a weft thread through said arch, slack-giving means for deflecting said weft laterally into a series of weft loops with relation to the warp loops, and means to close the warp loops tightly around the weft thread until the warp threads are straightened, thereby coiling the weft thread about said warp threads at the base of each weft loop.

15. In a loom, a knotting mechanism, including a series of warp carriers each provided with means for bending a pair of warp threads into the form of a loop, means for moving said warp carriers to change the size of the loops, operating mechanism coöperating therewith to intercoil with said pair of threads a thread extending lengthwise transversely of the loom, and easing mechanism for letting off and taking up the warp threads as required by the movements of said warp carriers.

16. In a loom, a knotting mechanism, including a series of warp carriers each provided with means for bending a warp thread into the form of a loop, means for moving said warp carriers to change the size of the loops, and means to deliver a weft thread through the warp loops, said mechanism containing means to convert each warp-loop into a weft-coil in the weft thread around the adjacent warp thread, and means to beat up the said weft-coils along said warp threads.

17. In a loom, a knotting mechanism, including a series of warp carriers each provided with means for bending a warp thread into the form of a loop, means for moving said warp carriers to change the size of the loops, and means to deliver a weft thread through the warp loops, said moving means and warp carriers containing means operating in connection with the warp threads to bend the weft thread around the warp-threads.

18. In a loom, a knotting mechanism, including a series of warp carriers each provided with means for bending a warp thread into the form of a loop, means for moving said warp carriers to change the size of the loops, means to deliver a weft thread through the warp loops, said moving means and warp carriers containing means to bend the weft-thread at its points of intersection with the warp-threads, and easing mechanism to render said warp threads taut, thereby pulling the loops straight and coiling the weft about the warp threads.

19. In a loom, warp carriers, operating mechanism coöperating therewith to arch the warp threads in alined loops, a series of fingers movable into position to form a race-way at said loops, a weft-carrying device and operating means for moving the same along said race-way, and means for moving said fingers into engagement with the weft to form a series of loops throughout the length of the latter.

20. In a loom, warp carriers, operating mechanism coöperating therewith to arch the warp threads in alined loops, a weft-carrying device and operating means for moving the weft thread through said alined loops, a series of fingers, means for engaging said fingers with the weft to form a series of loops therein, coöperating coiling means to coil the weft thread and warp threads together, and mechanism to beat up said loops substantially compactly lengthwise of the warp threads.

21. In a loom, knotting mechanism to knot together a weft thread and warp threads, including warp carriers, operating mechanism coöperating therewith to arch the warp threads in alined loops, a weft-carrying device and operating means for moving the weft thread through said alined loops, a series of fingers, means for progressively engaging said fingers with the weft to form a series of loops therein, and mechanism to beat up said loops.

22. In a loom, warp carriers, operating mechanism coöperating therewith to arch the warp threads in alined loops, a weft-carrying device and operating means for moving the weft thread through said alined loops, a series of fingers, means for progressively engaging said fingers with the weft to form a series of loops therein, said progressive engagement following the movement of the weft-moving means alternately from the opposite sides of the loom, means coöperating with the aforesaid mechanism to coil together the weft thread and warp threads at their points of intersection and mechanism to beat up said loops.

23. In a loom, means to support two ground warp threads, means for delivering a weft thread transversely thereof, and means coöperating therewith to tie said weft thread, while intact, onto said ground warp threads, with an oriental coil comprising a coil of said weft thread around at least one of said ground warp threads.

24. In a loom, means to support two ground warp threads, means for delivering a weft thread transversely thereof, and means coöperating therewith to tie an oriental coil of said weft thread, while intact, about said two ground warp threads, with a continuous movement of the loom.

25. In a loom, means to support a plurality of pairs of ground threads in predetermined weaving position with the threads of each pair close together, a shuttle and shuttle-driving mechanism for delivering a shuttle thread in a direction transverse to the ground threads, and means coöperating with said shuttle and driving mechanism to tie the shuttle thread extending intact from said shuttle onto a pair of said ground threads so as to hold the threads of the pair tightly together with a coil of the shuttle thread around at least one thread of said pair in a complete circle.

26. In a loom, means to support a plurality of pairs of ground threads in predetermined weaving position, a shuttle and shuttle driving mechanism for delivering a shuttle thread in a direction transverse to the ground threads, and means coöperating with said shuttle and driving mechanism to tie said weft thread, while intact from said shuttle, about said ground threads in oriental coils.

27. In a loom, means to support a plurality of pairs of ground threads in predetermined weaving position, a shuttle and shuttle-driving mechanism for delivering a shuttle thread intact back and forth in a direction transverse to the ground threads, and means coöperating with said shuttle and driving mechanism to tie the continuous shuttle thread about pairs of the ground threads on separate picks, said shuttle-thread remaining meanwhile intact and connected both to the fabric and to the shuttle.

In testimony whereof, I have signed my name to this specification, in the presence of two subscribing witnesses.

THOMAS P. WALSH.

Witnesses:
 GEO. H. MAXWELL,
 EDWARD MAXWELL.

with said shuttle and driving mechanism to tie said weft thread, while intact from said shuttle, about said ground threads in oriental coils.

27. In a loom, means to support a plurality of pairs of ground threads in predetermined weaving position, a shuttle and shuttle-driving mechanism for delivering a shuttle thread intact back and forth in a direction transverse to the ground threads, and means coöperating with said shuttle and driving mechanism to tie the continuous shuttle thread about pairs of the ground threads on separate picks, said shuttle-thread remaining meanwhile intact and connected both to the fabric and to the shuttle.

In testimony whereof, I have signed my name to this specification, in the presence of two subscribing witnesses.

THOMAS P. WALSH.

Witnesses:
GEO. H. MAXWELL,
EDWARD MAXWELL.

---

Correction in Letters Patent No. 1,064,405.

It is hereby certified that in Letters Patent No. 1,064,405, granted June 10, 1913, upon the application of Thomas P. Walsh, of Worcester, Massachusetts, for an improvement in "Looms for Tying Oriental Knots," an error appears in the printed specification requiring correction as follows: Page 6, line 3, after the word "weft" insert the words *thread about the warp;* and that the said Letters Patent should be read with this correction therein that the same may conform to the record of the case in the Patent Office.

Signed and sealed this 8th day of July, A. D., 1913.

[SEAL.]

C. C. BILLINGS,
*Acting Commissioner of Patents.*

It is hereby certified that in Letters Patent No. 1,064,405, granted June 10, 1913, upon the application of Thomas P. Walsh, of Worcester, Massachusetts, for an improvement in "Looms for Tying Oriental Knots," an error appears in the printed specification requiring correction as follows: Page 6, line 3, after the word "weft" insert the words *thread about the warp;* and that the said Letters Patent should be read with this correction therein that the same may conform to the record of the case in the Patent Office.

Signed and sealed this 8th day of July, A. D., 1913.

[SEAL.]

C. C. BILLINGS,
*Acting Commissioner of Patents.*